Oct. 29, 1957 E. J. HOUDRY 2,811,425
CATALYTIC EXHAUST GAS CONVERTER
Filed June 13, 1950 3 Sheets-Sheet 1

INVENTOR.
EUGENE J. HOUDRY
BY
Ira L. Nickerson
ATTORNEY.

Oct. 29, 1957 E. J. HOUDRY 2,811,425
CATALYTIC EXHAUST GAS CONVERTER

Filed June 13, 1950 3 Sheets-Sheet 2

INVENTOR.
EUGENE J. HOUDRY
BY
Ira L. Nickerson
ATTORNEY.

Oct. 29, 1957  E. J. HOUDRY  2,811,425
CATALYTIC EXHAUST GAS CONVERTER
Filed June 13, 1950  3 Sheets-Sheet 3
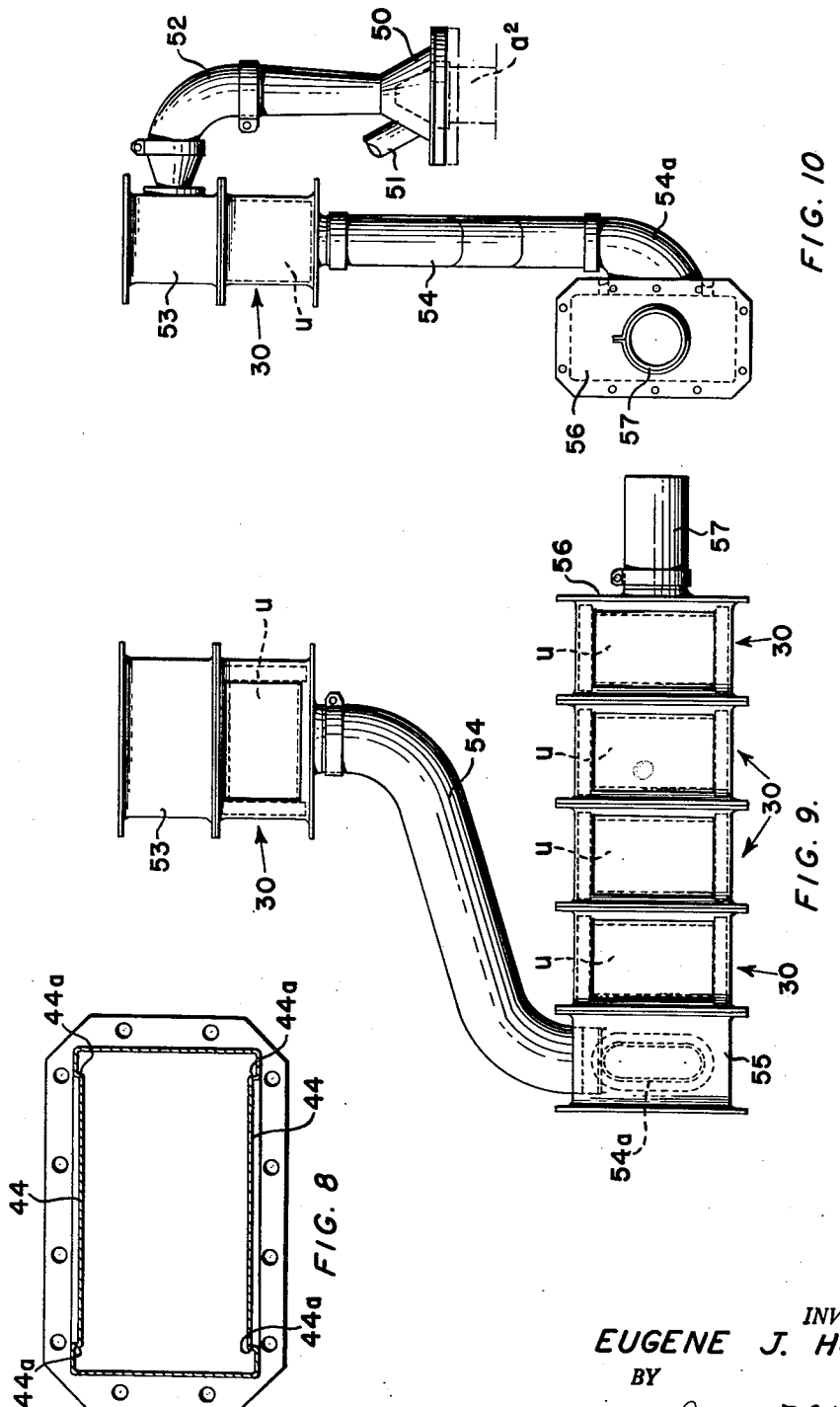
INVENTOR.
EUGENE J. HOUDRY
BY
Ira L. Nickerson
ATTORNEY.

United States Patent Office 2,811,425
Patented Oct. 29, 1957

2,811,425

CATALYTIC EXHAUST GAS CONVERTER

Eugène J. Houdry, Ardmore, Pa., assignor to Oxy-Catalyst, Inc., a corporation of Pennsylvania Application June 13, 1950, Serial No. 167,856

2 Claims. (Cl. 23—288)

This invention relates to internal combustion engines and more particularly to methods and means for treating the exhaust products of the same, specifically for effecting oxidation of burnable components and for rendering harmless and non-offensive toxic as well as malodorous materials and compounds in the exhaust gases of such engines. In certain respects the invention may be considered as an improvement on or a further development of the invention disclosed in my copending application Serial No. 109,288 filed August 9, 1949, now issued as Patent No. 2,664,340, it being understood, however, that while said copending application relates particularly to engines of large size, as above 350 sq. in. of piston displacement, the present invention is directed more toward small engines of much less piston displacement, as of 300 sq. in. and less; however, in many respects the improvements are applicable to the treatment and cleaning of exhaust gases of internal combustion engines generally regardless of the size of the engines.

The stream of exhaust gases from an engine presents the usual inconstancy of all factors incident to its operation and common to all gasoline powered engines. Throughput, chemical composition and temperature of the stream vary constantly over a wide range. Throughput varies from one to ten. Carbon monoxide content in the exhaust gases varies from 9.0 to 0.4 percent. Hydrogen varies from 4.0 percent to traces. Aldehydes, unburned fuel and acids are always present and are particularly noticeable when the engine is idling and during deceleration. There are also encountered other changes and variations due to poor carburetor adjustment, excess lubrication, faulty ignition or failure of spark plugs, worn piston rings, etc.

A check of temperatures at the end of the exhaust manifold of an engine showed 600° F. at 650 R. P. M. without load and 1100° F. at 2000 R. P. M. at three-quarter load. At no load operation the analysis of the exhaust gases indicated 7.8 percent carbon monoxide and 3.3 percent hydrogen requiring the addition to the exhaust gases of 35 to 40 percent by weight of fresh air to provide the amount of oxygen required to render the exhaust gases non-poisonous. The subsequent oxidation of the CO and hydrogen by catalysis as herein described liberates enough B. t. u.'s to raise the temperature of the mixture of fresh air and exhaust gases by approximately 1300° F. Using a venturi as the air inlet lowers the idling temperature of the exhaust gases from 600° to 450° F. so that the maximum temperature after oxidation is about 1750° F., discounting heat losses by radiation and convection during the oxidation of the unburned components in the exhaust gases.

At 2000 R. P. M. and three-quarter load the temperature of the exhaust gases leaving the exhaust manifold is higher, as around 700° F. when mixed with the required amount of fresh air, but since there is a much lower content of burnable material the maximum temperature after oxidation is about 1200° F., discounting heat losses during oxidation.

By extensive experimentation it has been determined that catalytic apparatus of compact form can be devised to clean exhaust fumes of all burnable, toxic and malodorous components by the use of a series of catalytic units in close juxtaposition to each other, and still avoid excessive temperatures, provided that:

(a) The mixture of gases passes through the apparatus at suitable velocity; and (b) The arrangement and spacing of the catalytic elements is such that the temperature rise in the gases is progressive up to about 1200° F. while the gases move through the metal container for the catalytic units and give up heat to the atmosphere by radiation and convection.

A principal object of the invention is to render non-poisonous and odorless the exhaust gases of internal combustion engines.

Another object is to eliminate carbon monoxide and other obnoxious constituents present in exhaust gases at all engine speeds.

Another object is to accomplish the above results with a minimum of back pressure upon the engine.

Another object is effectively to control the extent and the rate of the oxidation.

Another object is to oxidize burnable components in exhaust gases by catalytic means while avoiding excessive and dangerous temperatures.

Still another object is to provide apparatus for cleaning exhaust gases which is simple, compact and sturdy, and which is readily adaptable to engines of different sizes and to easy adjustment to and installation in cramped and restricted locations.

Still other objects and advantages will be apparent from the detailed description which follows.

The present invention utilizes oxidizing catalysts in a manner to prolong their effective life and so mounted and arranged as to avoid attrition losses and to produce a minimum of back pressure. Catalytic elements of teardrop or streamlined contour in cross section are utilized and these are by preference mounted independently and fixedly supported in a unitary structure, as of the type disclosed in my copending application Serial No. 159,191 filed May 1, 1950, now issued as Patent No. 2,730,434. A series of such units are suitably mounted in an elongate container which receives the exhaust of the engine mixed with an oxygen containing gas, such as air, in an amount in excess of that needed to support the combustion of all burnable components in the exhaust gases. The catalytic units are in two zones, which may be juxtaposed or separated depending somewhat on the size of the engine and the extent and location of the space available in which to mount the catalytic apparatus. Such space is quite limited on lift trucks, tractors, compressors, and other types of equipment adapted for indoor use and powered by small gasoline engines. In the first catalytic zone the oxidation reaction is initiated and in order to control its intensity and the degree of heat liberated a reduced number of catalytic elements are mounted in the unit or units in such zone, a greater number and/or concentration of elements being provided in the units in the second or subsequent zone to complete the oxidating reaction. The air mingled with the exhaust gases plus heat transfer by radiation and convection from the container to the surrounding atmosphere is sufficient in most cases to hold catalyst temperatures to a safe range below 1500° F. However, there is provision for limited additional cooling, if desired or required. The interior of the container provides supporting guides for the end members of the catalytic units as well as means to prevent the exhaust gases from by-passing the catalytic elements. The container is formed in one piece or in sections as desired or required. Sectional members are flanged for easy assembly and attachment to one another. By preference each section holds a single catalytic unit and spacers and gaskets between sections eliminate leakage and hold the units against movement. By making the spacers of sufficient extent to project outwardly as well as inwardly beyond the flanges of the sections, an effective amount of heat exchange is obtained without any appreciable increases in the length of the container. A thermocouple or other temperature responsive device located beyond the last catalytic unit of the exhaust cleaner to actuate a pyrometer in view of the operator of the engine gives him a constant indication of the functioning of the apparatus and a visual warning when it ceases to operate properly.

In order to illustrate the invention concrete embodiments of apparatus for carrying out the process are shown in the accompanying drawings in which:

Figure 8 is a horizontal sectional view on the line 8—8 of Figure 7 of a section before a catalytic unit is inserted;

Figures 9 and 10 are respectively side and end elevational views of a sectional form of exhaust cleaner similar to that of Figure 4 but showing a modification.

Figure 1:
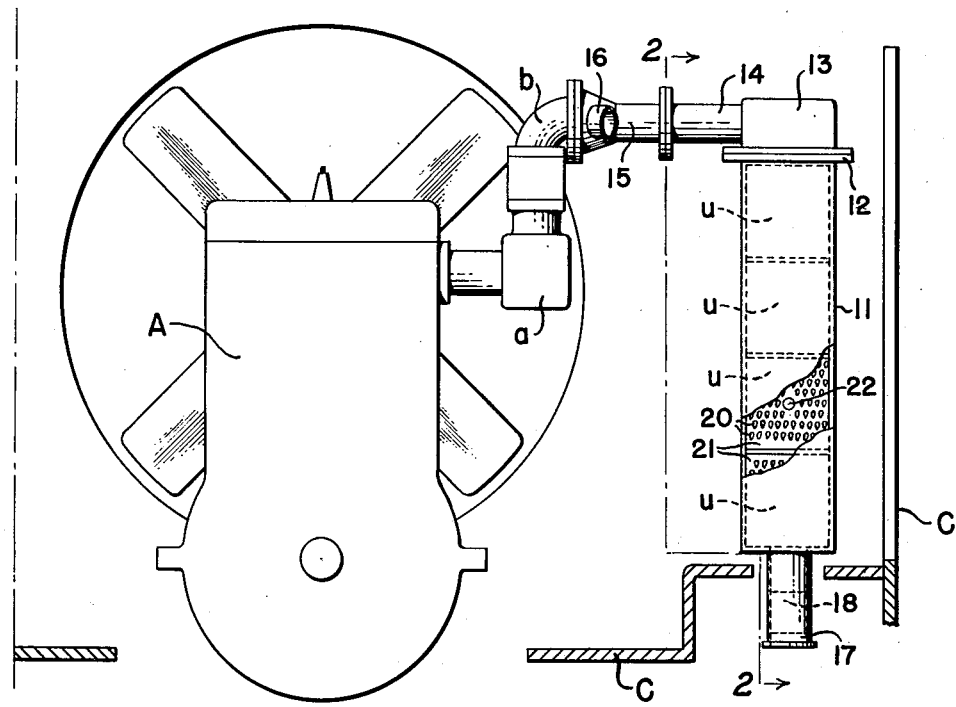
Figure 1 is an end elevational view with part of the exhaust cleaner broken away and indicating an internal combustion engine to which the cleaner is attached and parts of the supporting frame for the engine in section.

Figure 1 shows at A an internal combustion engine having an exhaust manifold $a$ from which extends a conduit $b$ to the flanged end of which is connected the exhaust cleaner and muffler of the present invention. The latter comprises an elongate steel container 11 which is rectangular in plan or cross section (Figure 3) and is provided at its upper end with an outwardly projecting transverse flange to which is secured by bolts or rivets (not shown) a similarly flanged cover connection 13. A pipe 14 extending laterally from cover connection 13 is joined through an intervening pipe section 15 with exhaust conduit $b$. Pipe section 15 has an air inlet 16 to a venturi (not shown) for automatically admitting air in proper amount to mix with the stream of exhaust gases passing to container 11. The lower end of container 11 is closed save for a short outlet pipe 17 which has a side opening 18 for the release of the cleaned and neutral gases to atmosphere. Portions of the supporting frame C which may be on or a part of the chassis of a vehicle are indicated in Figure 1.

The interior of the container 11 is spanned by a multiplicity of fixed, independently mounted and closely spaced catalytic elements 20 in the form of sticks or rods arranged in rows with the elements in adjacent rows in staggered relation. By preference, these elements 20 are in units, their ends being supported in apertures or recesses in pairs of end members or plates 21 (Figures 1 and 3) secured together by a central post 22 to form a frame. Elements 20 are glazed, cemented or otherwise secured at one end to one of said end members or plates 21 while their opposite ends are free to slide in the apertures in the other of said end members or plates 21 to avoid breakage under temperature changes. As shown through the cut away portion of container 11 in Figure 1 the apertures in end members 21 of the catalytic units are of teardrop or streamlined design and the catalytic elements seated therein are of complementary contour in cross section, and are all disposed with their tapered edges extending in the same direction so that gases passing through container 11 will pass over the surfaces of elements 20 with a minimum of turbulence and back pressure.

Figures 2, 3:
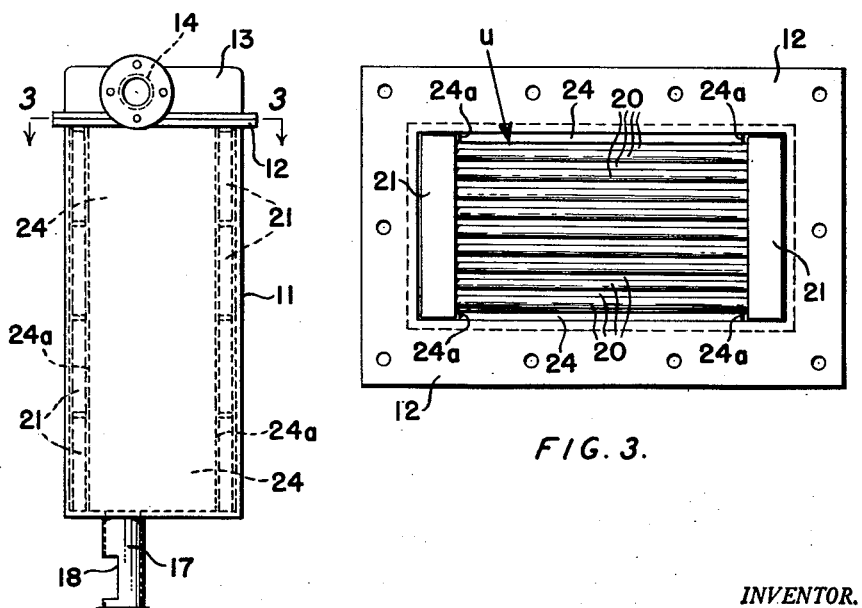
Figure 2 is a side elevational view of the exhaust cleaner from the left of Figure 1 as along the line 2—2 of Figure 1, the air inlet connection for the cleaner having been removed.
Figure 3 is a top plan view on an enlarged scale, as on the line 3—3 of Figure 2, the cover or top connection of the cleaner having been removed.

The catalyst units indicated generally by $u$ (Figure 1) are stacked one upon another in container 11 with the end members or plates 21 of the units in direct contact with one another as indicated in Figures 1–3. Four such catalytic units are shown (Figures 1 and 2) as filling the container. The latter is provided on its interior with side plates 24 which extend the full length of the container but are spaced from both end walls thereof a sufficient distance so as to provide shoulders 24a to serve as guides for end members 21 of the catalytic units. Otherwise plates 24 substantially fill the side spaces so as to force the stream of exhaust gases into contact with the catalytic elements 20 and prevent by-passing of the gases along the sides of container 11.

The top or upper catalyst unit in container 11 will be the first to be contacted by the mixture of exhaust gases and fresh air and will comprise the first zone, the three subsequent units comprising the second zone. Since the first unit initiates the oxidizing reaction it is provided with fewer catalytic elements 20 than are the subsequent units. In this manner the intensity of the reaction is controlled and the heat liberated is distributed in a substantially uniform manner throughout the length of container 11, whence it is dissipated by conduction, convection and radiation to adjacent parts of the apparatus and to the atmosphere. In general, adequate control of the reaction is obtained by providing a full complement of catalytic elements 20 in the three units making up the second zone and by reducing the number of catalytic elements in the first unit or zone to from 50 to 75 percent of a full complement, depending upon the size or piston displacement of the engine.

Figure 4:
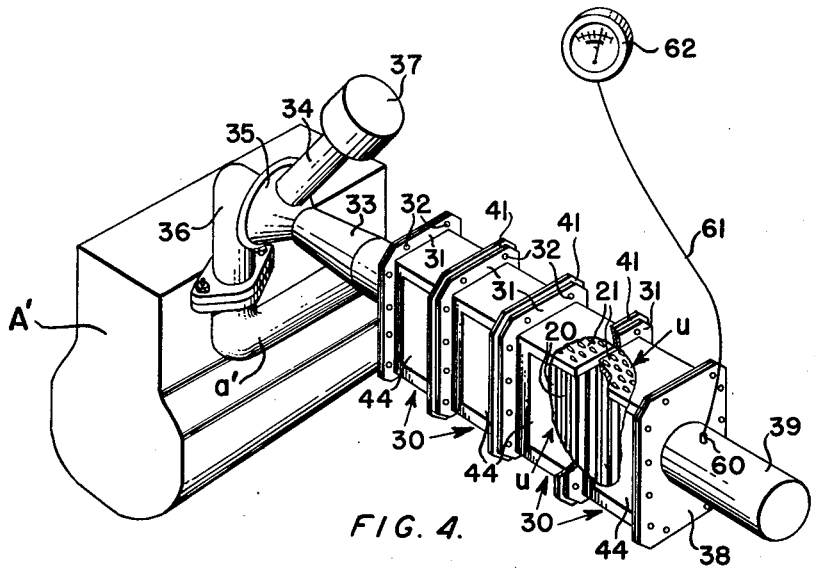
Figure 4 is a perspective view, partly broken away, of a modified or sectional exhaust cleaner and indicating an engine to which it is attached.
Figure 7:
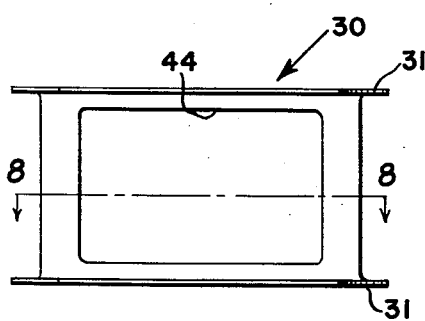
Figure 7 is an enlarged side elevational view of one of the sections of the cleaner shown in Figure 4.

Figure 4 shows a cleaner and muffler of the same capacity as that of Figures 1–3 and with the same number of catalytic units of the same size. In this instance the container is made up of four identical sections 30 each containing a single catalyst unit which fills the interior thereof, the parts of the unit being designated by the same reference characters as in Figures 1 and 3. Each section 30, one of which is shown by itself in Figure 7, is rectangular in shape with closed ends and opposite open sides. Each open side is bordered by an outwardly directed flange 31 having a series of holes 32 therethrough for the insertion of bolts or rivets to secure the sections together in assembled relation as shown in Figure 4. One open end of the assembled sectional container will be closed by an end plate, having a supply pipe 33 extending therefrom which includes an air inlet pipe 34 for a venturi portion 35 and a flanged bent portion 36 for attachment to the exhaust manifold $a^1$ of an internal combustion engine indicated diagrammatically at $A^1$. Air inlet 34 may be provided at its outer end with an air filter 37. The opposite end of the assembled sectional container is closed by a plate 38 having an exit pipe 39 for discharge of the cleaned exhaust to atmosphere.

Figure 6:
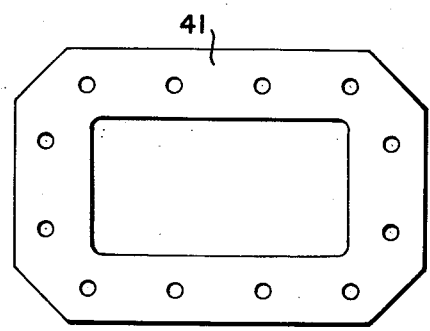
Figure 6 is a plan view of one of the spacers on the scale of Figures 5, 7 and 8.
Figure 5:
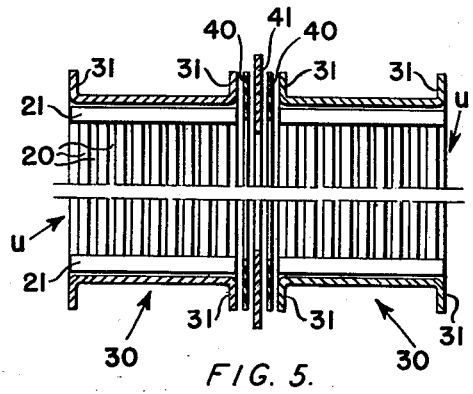
Figure 5 is a broken away somewhat diagrammatic view of two adjacent sections of the exhaust cleaner to indicate the manner of assembly and the spacer and gaskets between the sections.

While sections 30 of the container may be disposed in juxtaposition with the flanges 31 of adjacent sections in direct contact, a gasket such as 40 (Figure 5) will usually be inserted to prevent leakage and to keep the end members 21 of the catalytic units $u$ in adjoining sections out of direct contact. However, by preference a metallic spacer or washer 41 is interposed between flanges 31 of adjacent sections with a gasket 40 on either side of spacer 41 (Figure 5). Spacer or washer 41 may be of the identical size of gaskets 40. By making spacer 41 of greater width, however (Figures 5 and 6), so as to project both inwardly and outwardly beyond both flanges 31 and gaskets 40, it not only effects separation of the catalytic units and holds them securely against movement, but also serves as a heat exchanger between the exhaust gases within the container and the external atmosphere which is made turbulent by flanges 31 and the projecting portions of spacers 41. Gaskets 40 and spacers 41 are provided with holes which register with the holes 32 in flanges 31 to receive the rivets or bolts which secure the sections 30 together in assembled relation.

Sections 30 are formed with inwardly depressed portions or panels 44 in their side walls (Figures 4, 7 and 8) to perform the functions of side plate 24 of the first form of the invention, namely, to prevent by-passing of exhaust gases along the sides of the catalytic units and to provide internal shoulders 44a (Figure 8) to serve as guides for the inner faces of end members 21 supporting the catalytic elements 20.

Figures 9 and 10 illustrate a modified form of sectional cleaner and muffler adapted to a larger engine and utilizing more than four catalytic units. To the engine manifold $a^2$ or a connection therefrom is attached a venturi 50 having an air inlet at 51 and a conduit 52 in one or more pieces for conducting exhaust gases mixed with air to an empty section 53 closed at its upper end and opening into a single catalytic section 30 (such as previously described and shown in Figures 4–8) containing a catalytic unit $u$. A conduit 54 leads from the first catalytic zone, connecting at 54a with the side of an empty section 55 which opens directly into the second zone made up of four catalytic sections 30, each containing a catalytic unit $u$. The end plate 56 in the last section 30 has an outlet pipe 57 for the release of the cleaned and neutral gases to atmosphere.

In assembling sectional cleaners and mufflers of the types shown in Figures 4–10, a catalytic unit $u$ is inserted into each section 30 with end members 21 of each unit moving along guide shoulders 44a (Figure 8). The required number of sections 30 are placed in juxtaposition; in the case of Figure 4, to form a single container for both catalytic zones in which all four catalytic units $u$ are disposed, and, in the case of Figures 9 and 10, to form two containers connected by conduit 54. The juxtaposed sections are then bolted or riveted together, gaskets 40, or preferably spacers or washers 41 and gaskets 40, being interposed between the flanges 31 to prevent leakage and/or to establish a desired degree of heat exchange.

The size of catalytic unit selected and shown provides end members 21 which are each 3" square and 3/8" to 1/2" in thickness with 73 apertures therein to receive and support the streamlined elements 20 which are 5¼" in length. End plates 21 and connecting posts 22 are by preference formed of ceramic material, such as porcelain having little or no porosity, while elements 20 are formed of porcelain of low porosity as of the order of 15 percent, all of which parts, having been heated into the temperature range of 2300° to 3900° F. to make them tough, hard and stable both physically and chemically. Upon such a unit, which is catalytically inert, any suitable or desired oxidizing catalysts may be deposited. A desirable combination of catalysts is a thin but firmly adherent film of alumina followed by impregnation of such film with finely divided metal such as platinum or silver, or copper, etc. The parts making up the frame of the catalytic units, namely end plates 21 and connecting posts 22, may, if desired, be made of materials other than ceramics, as for example, metals and alloys of metal; cast iron which has been calorized or coated with a porcelain enamel is particularly suitable for the frame parts. When metal is used for end members 21, the latter can be made thinner than 3/8".

The exhaust cleaner and muffler of Figure 1 or Figure 4 is suitable for a gasoline engine having a piston displacement of the order of 124 cu. in. and that of Figures 9 and 10 for an engine of about 217 cu. in. To determine the size and arrangement of the muffler for a given engine the following steps are taken:

(1) The steel surface sufficient to radiate to the atmosphere enough heat of the oxidizing reaction to hold the steel at about 750° F. is first determined. Such determination is simple when it is known that by using catalytic elements as herein described they can be spaced or arranged so that the average temperature of the gases over their length of flow is approximately 1100° F., with a maximum of about 1200° F.;

(2) The cross sectional area is determined to give a pressure drop through the catalytic elements of less than 1" of water when the engine is running under conditions of richest mixture, the pressure drop being dependent upon the number of catalytic elements necessary to complete the oxidation and their spacing; and (3) After proper dimensioning of the steel container is established, the number and arrangement of catalytic elements in the units $u$ are determined by experimentation so as to hold the temperature of the gases in the desired range, i. e. 1000–1200° F. so that the catalyst will never be above 1500° F. during any normal operation of the engine.

The experimentation is not difficult in as much as it is made on the engine when operating close to idling, which corresponds to the condition of richest mixture. Since the catalytic elements 20 in units $u$ are not in compact relation but are spaced apart, the free space between them is of extreme importance, governing as it does the velocity of the exhaust gases and the pressure drop through the container. This free space is obviously related directly to piston displacement of the engine. It has been found that the free space between the catalytic elements in one row across the muffler should be in the range of 2 to 8 sq. in. for every 100 cu. in. of piston displacement and preferably between 3 and 6 sq. in. per 100 cu. in. of piston displacement.

It has been further found that adjustment in the number and spacing of catalytic elements can be limited to the first zone of contact and in most instances to the first catalytic unit contacted by the exhaust gases. This is due to the fact that the amount of oxidizable gases and vapors decreases rapidly in the first catalytic unit from some 8 percent by volume to approximately 2 percent by volume. Consequently after the first unit there is in most cases no more danger of excessive temperatures and it is then desirable, in order to completely clean the fumes, to install the catalytic elements in the second zone as close to one another as the pressure drop permits. When using catalytic units $u$ of the type disclosed, each having provision for 73 streamline elements, it was determined by experimentation that the first unit or zone of the muffler of Figure 1 or Figure 4 should contain 40 elements, while for the muffler of Figures 9 and 10 with some intermediate cooling between the first and second zones effected by conduit 54, the number of elements in the first zone or unit is 50. In other words, the number of catalytic elements in the first zone will be 15 to 20 percent of the number of elements in the second zone.

The forms of exhaust cleaners and mufflers shown and described herein when used in connection with engines of the specified piston displacement eliminated all odors and practically all carbon monoxide in the exhaust gases when the engines were idling and the cleaned exhaust when sampled under all conditions of operation showed less than .005 percent of carbon monoxide content.

As a safety feature, especially when engines are operated indoors, it is desirable to have the operator constantly informed as to whether his exhaust cleaner is operating properly. One form of apparatus suitable for this purpose is shown in Figure 4. It comprises a thermocouple 60 at the outlet end of the cleaner and muffler, as in exit pipe 39 near end closure plate 38. Thermocouple 60 is connected by line or conduit 61 with a pyrometer 62 which is located in convenient view of the operator of the engine, as on the control board, or on the dashboard if the engine is mounted on a vehicle. A portion of the dial of the pyrometer may be marked in color, such as green, which may be designated "safe range" to indicate the zone of temperatures which correspond to efficient operation of the catalyst. The safe range may vary with the size and type of engine and with the location of the thermocouple in the outlet pipe but will usually be between 600° and 1200° F.; for example, the arrangement indicated in Figure 4 has a safe range marking on the pyrometer of 600° to 900° F. While the temperature indicating apparatus described above as a safety feature is shown only in connection with Figure 4, is is apparent that it can be applied readily to the catalytic cleaners and mufflers shown in Figures 1 and 9 and, in fact, to all types of mufflers where a recording of the exit temperature of gases is desired or required to indicate the functioning of an accessory or even of the engine itself.

For complete cleaning of the exhaust gases in internal combustion engines under normal operating conditions it is best to maintain the temperature of the oxidizing catalyst around 1100° F. This can be easily accomplished by controlling the size of the orifices of either the inlet of fresh air to the venturi system, or at the exit from the catalytic cleaner, or at both such places. By proper setting of the orifice or orifices it is possible to obtain automatically an admission of from 80 to 100 percent of fresh air by weight of exhaust gases under idling conditions, and from 20 to 30 percent by weight of fresh air under high speed and normal load conditions, due to the fact that the throughput of exhaust gases varies so widely, namely, from one to ten. At 2000 R. P. M. and three-quarter load, as compared with an idling operation at 650 R. P. M. and no load, the fresh air orifice to the venturi reduces the percentage of fresh air to exhaust fumes while control of the orifice after the catalytic cleaner increases back pressure on the system and has much the same effect. Obviously the same results can be obtained by proper selection of the size of the container for the catalyst units and by proper number and spacing of the catalytic elements in the units. However, calibrating the orifices permits standardization of the size of the container for the catalytic units which is highly desirable in attaining low production costs.

While it is desirable to use a maximum amount of fresh air so as to make it easier to avoid excessive temperatures, it is also desirable to limit the amount of fresh air so as to keep the gases while reacting in the temperature range of 1000 to 1200° F. under all operating conditions because within such range the oxidizing catalysts herein specified are fully active and consequently ready to meet the extremely variable conditions resulting from the inconstancy of the factors incident to the reaction and common to the operation of all gasoline powered engines. Some adjustment and control of temperatures is also possible through the use of metal spacers and washers such as 41 to produce some heat exchange with the atmosphere between the catalytic units and, in certain instances, by using a cooling section such as conduit 54 (Figures 9 and 10) between the catalytic zones of the cleaner and muffler.

While the invention has been herein disclosed in both its process and its apparatus aspects in what are now believed to be preferred forms, it is to be understood that the invention is not restricted to the specific details thereof but covers all changes, modifications and adaptations within the scope of the appended claims.

I claim as my invention:

1. A catalytic exhaust cleaner and muffler for internal combustion engines comprising an elongated container forming a passage for exhaust gases, catalytic units disposed in said container along a substantial portion of its length, each of said units comprising a pair of end plates supporting between them a plurality of rod-like elements, each element providing a surface of catalytically active material adapted to oxidize oxidizable constituents of said exhaust gases, said elements having streamlined contours to minimize turbulence and backpressure in the system and being arranged in relatively closely spaced rows with elements in adjacent rows in staggered relation to one another, such arrangement of said elements providing efficient contact between said elements and said exhaust gases and at the same time imposing a minimum of backpressure on the engine, said units being arranged in side-by-side relation in said container with said rod-like elements extending transversely of the flow of said exhaust gases, lateral walls of said container facing said rod-like elements being depressed inwardly toward said elements so as to prevent by-passing of exhaust gases between said elements and said lateral walls.

2. A catalytic exhaust cleaner and muffler for internal combustion engines comprising an elongated container forming a passage for exhaust gases, made up of a series of separable sections secured together, each section having mounted therein a unit comprising a pair of end plates supporting between them a plurality of rod-like elements, each element providing a surface of catalytically active material adapted to oxidize oxidizable constituents of said exhaust gases, said elements having streamlined contours to minimize turbulence and backpressure in the system and being arranged in relatively closed spaced rows with elements in adjacent rows in staggered relation to one another, such arrangement of said elements providing efficient contact between said elements and said exhaust gases and at the same time imposing a minimum of backpressure on the engine, said units being arranged in side-by-side relation with said rod-like elements extending transversely of the flow of said exhaust gases, the lateral walls of each section of said container which face said rod-like elements being depressed inwardly toward said elements so as to form inwardly depressed panels disposed closely adjacent to said elements so as to prevent by-passing of exhaust gases between said elements and said lateral walls, said inwardly depressed panels likewise providing guides for slidably receiving the end plates of said units.

References Cited in the file of this patent

UNITED STATES PATENTS

| | | |
|---|---|---|
| 1,043,580 | Eldred | Nov. 5, 1912 |
| 1,492,605 | Rice | May 6, 1924 |
| 1,522,111 | Franck-Philipson | Jan. 6, 1925 |
| 1,605,484 | Thompson et al. | Nov. 2, 1926 |
| 1,867,325 | Neville | July 12, 1932 |
| 1,915,958 | Skirrow | June 27, 1933 |
| 1,989,774 | Snow | Feb. 5, 1935 |
| 2,004,865 | Grison | July 11, 1935 |
| 2,025,140 | Wenzel | Dec. 24, 1935 |
| 2,288,943 | Eastman | July 7, 1942 |
| 2,389,204 | Ludi et al. | Nov. 20, 1945 |

FOREIGN PATENTS

| | | |
|---|---|---|
| 312,200 | Great Britain | May 21, 1929 |
| 411,377 | Great Britain | June 7, 1934 |
| 411,655 | Great Britain | June 14, 1934 |